Dec. 10, 1935.        J. E. TONE ET AL        2,023,824
APPARATUS FOR GASSING AND SEALING CONTAINERS
Filed Nov. 11, 1931        6 Sheets-Sheet 1
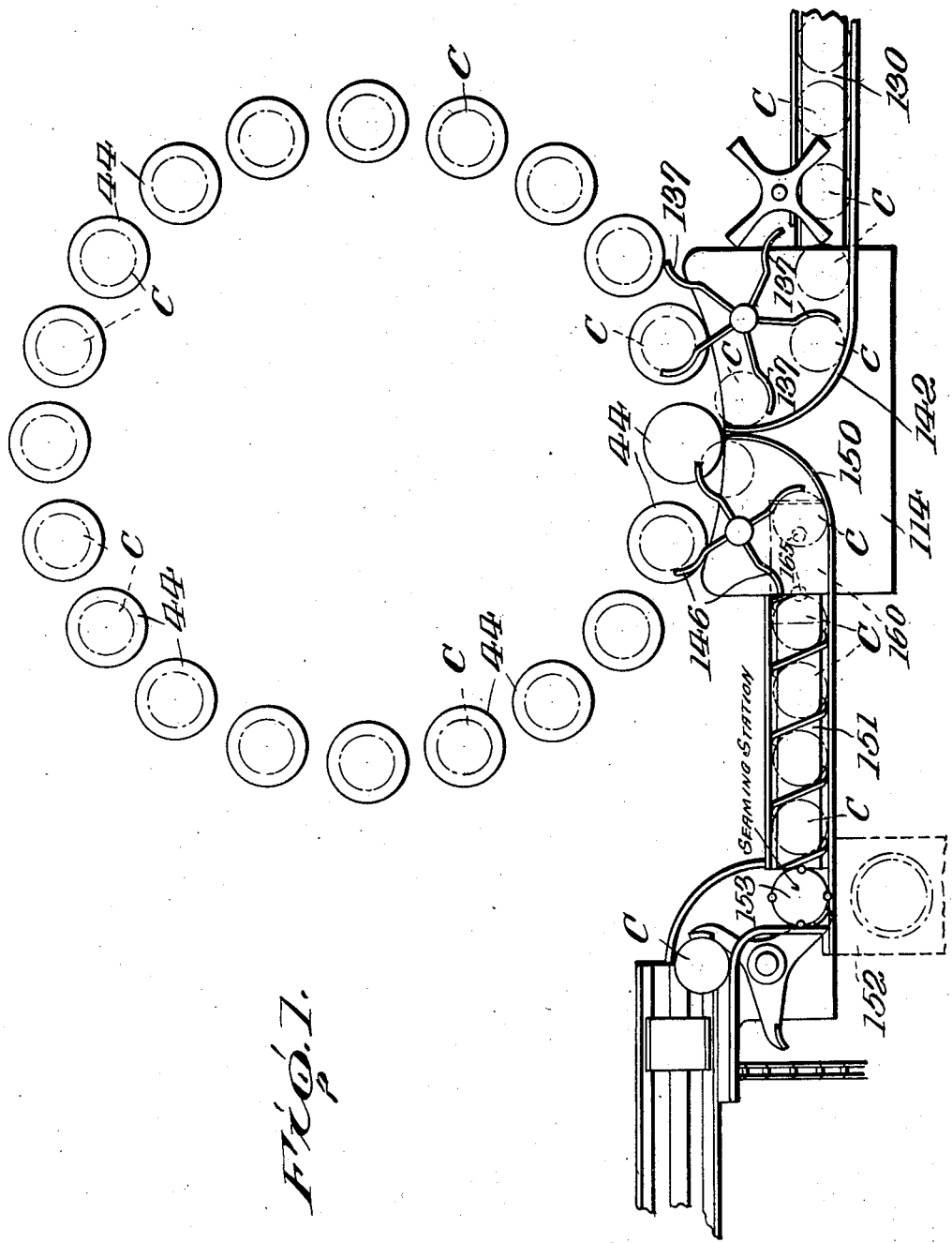

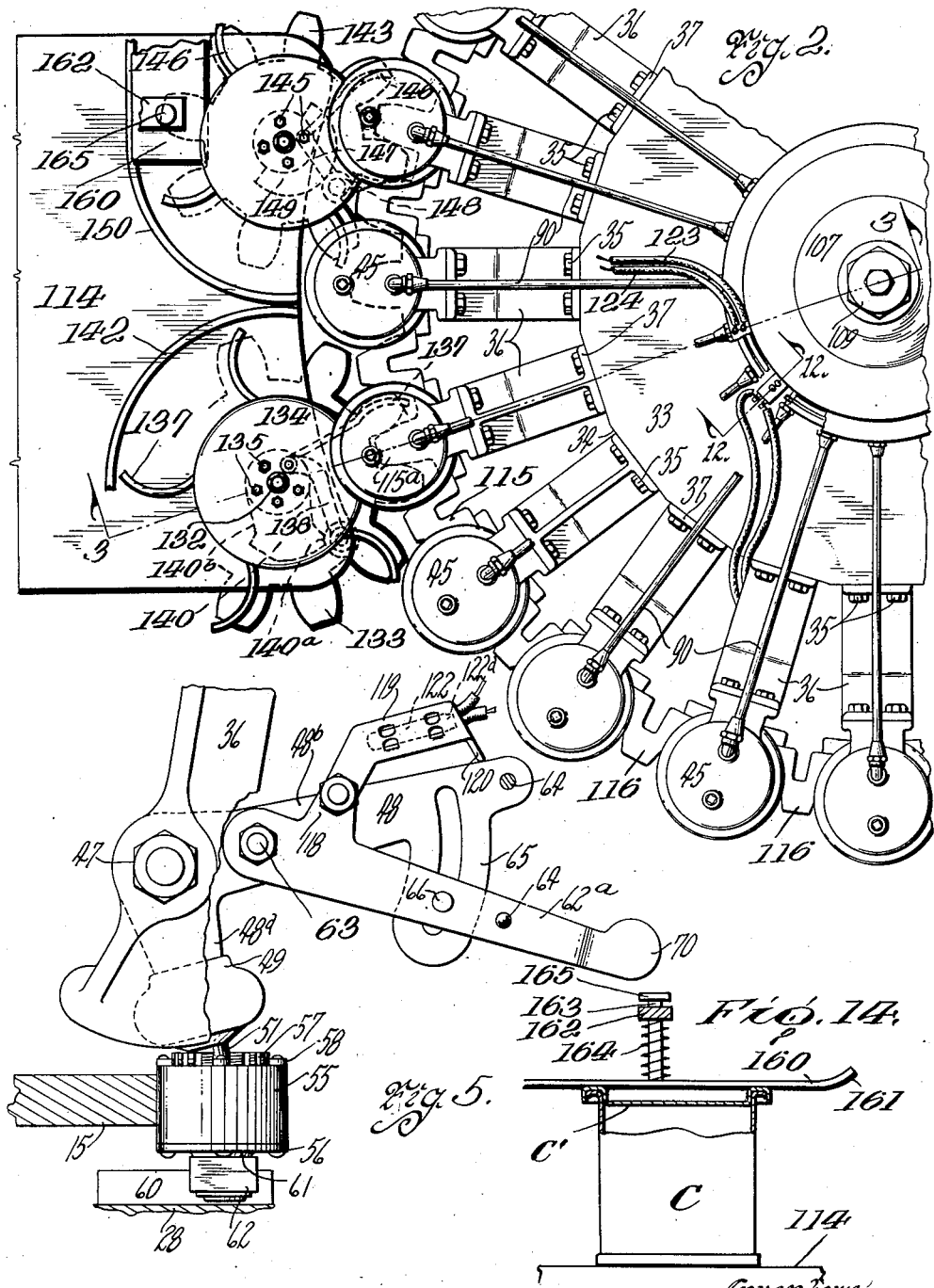

Dec. 10, 1935.   J. E. TONE ET AL   2,023,824
APPARATUS FOR GASSING AND SEALING CONTAINERS
Filed Nov. 11, 1931   6 Sheets-Sheet 3
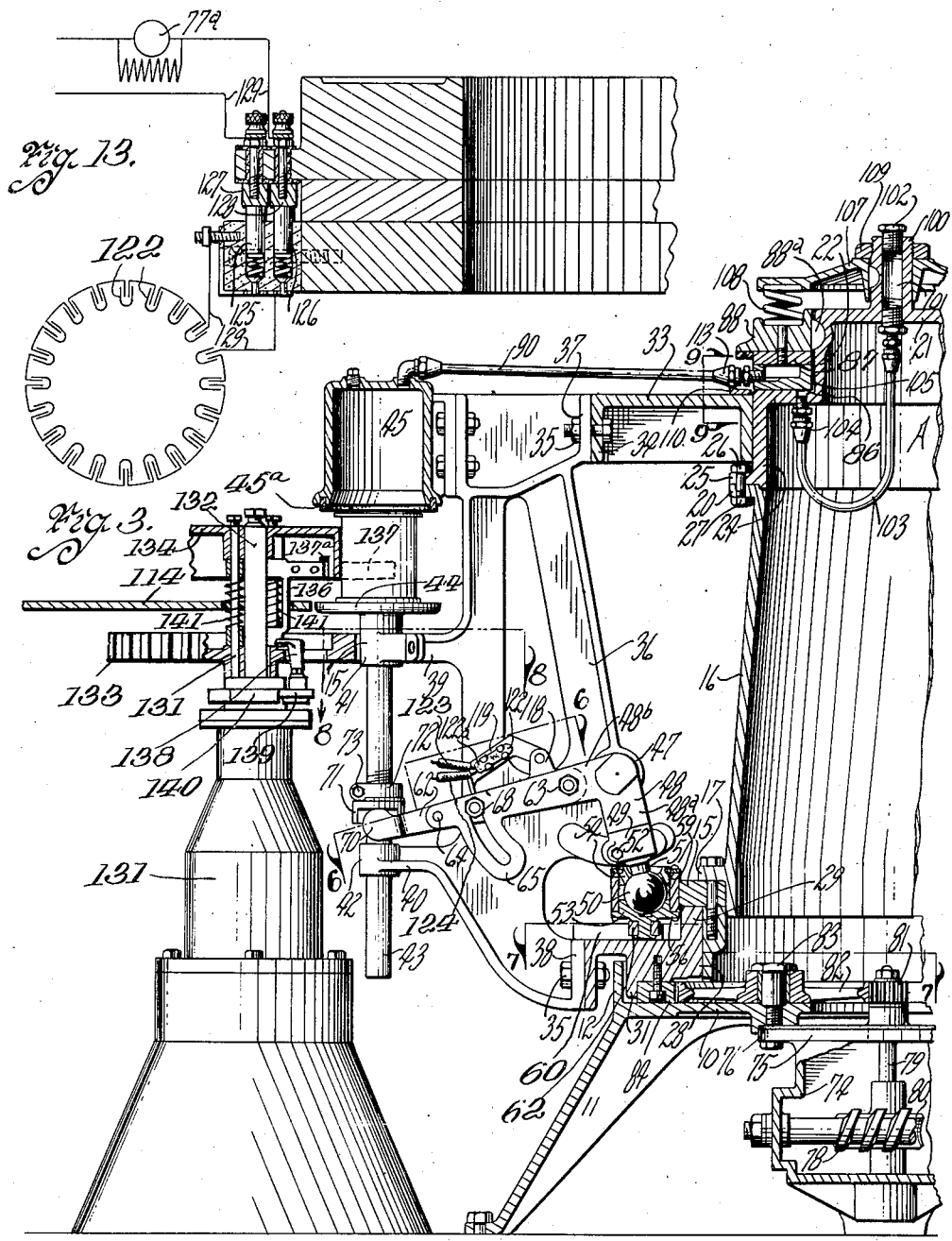

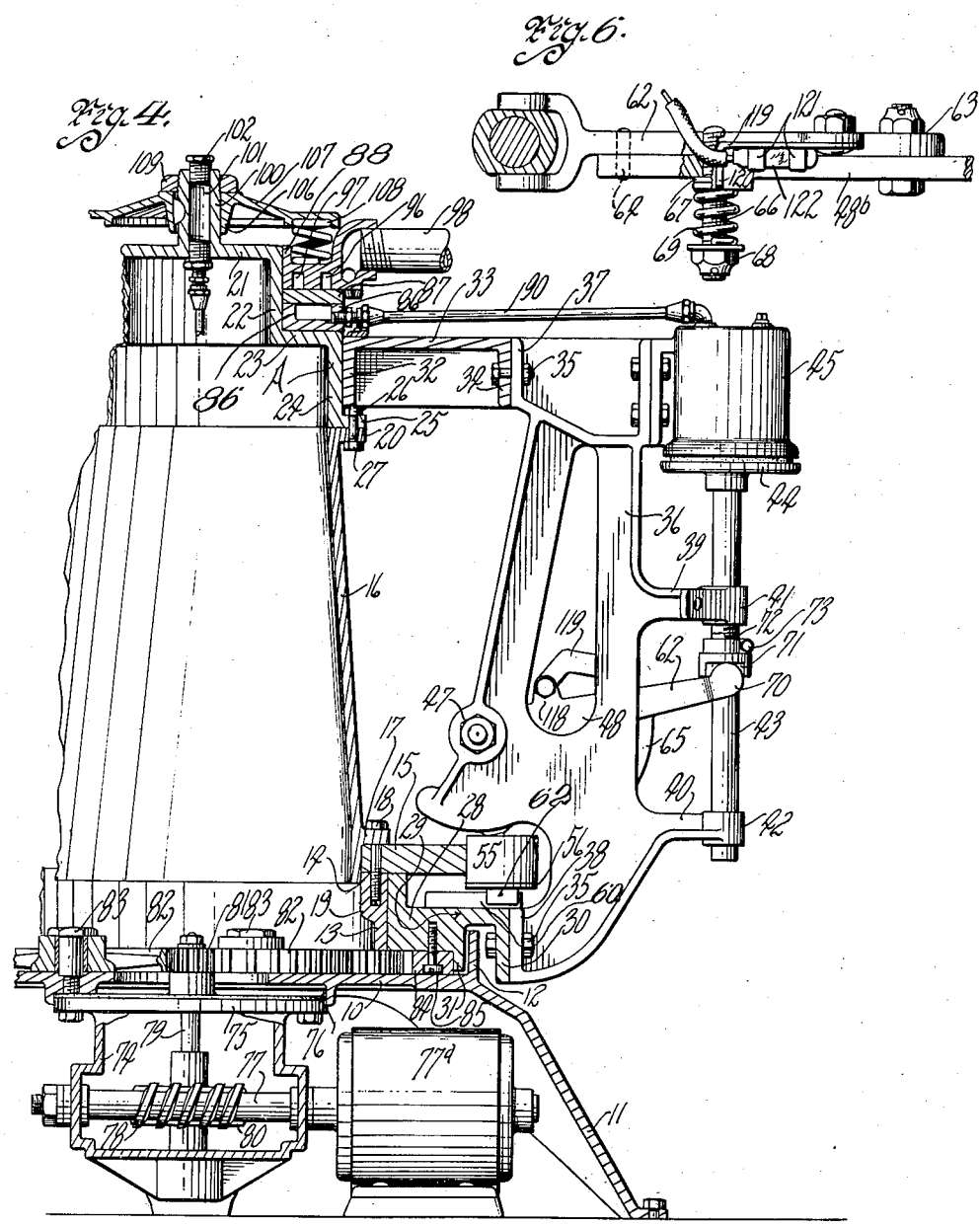

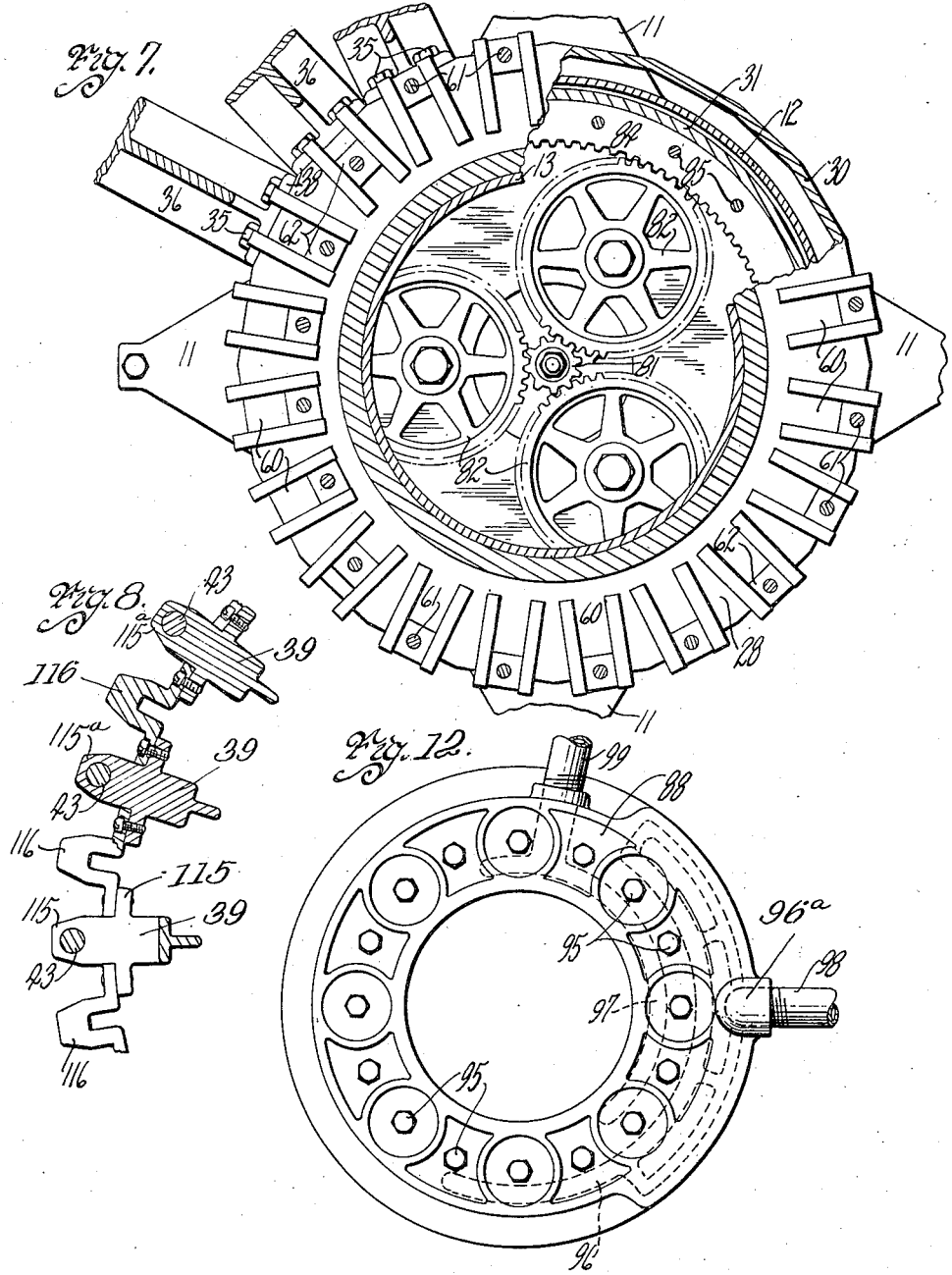

Dec. 10, 1935.   J. E. TONE ET AL   2,023,824
APPARATUS FOR GASSING AND SEALING CONTAINERS
Filed Nov. 11, 1931   6 Sheets-Sheet 6
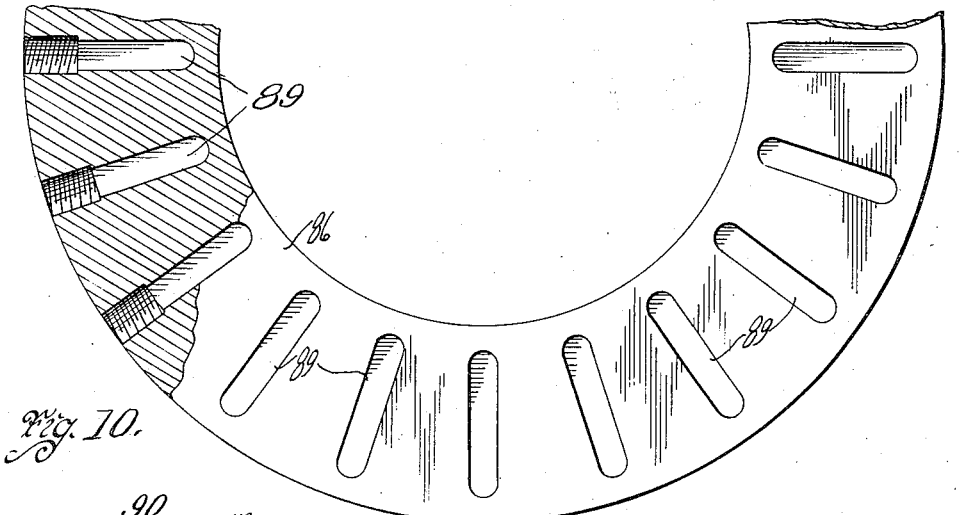
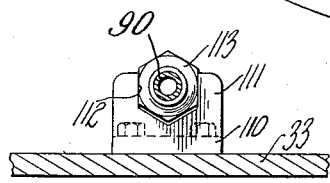
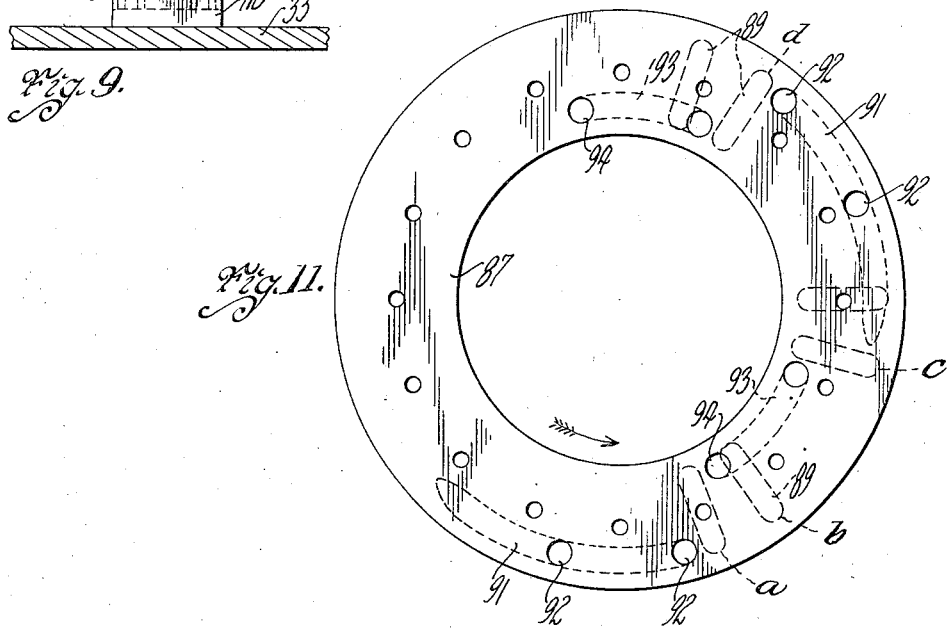
Inventors
Jay E. Tone & Fred J. Tone
By Sturtevant, Mason & Porter
Attorneys Patented Dec. 10, 1935

2,023,824

UNITED STATES PATENT OFFICE 2,023,824

APPARATUS FOR GASSING AND SEALING CONTAINERS

Jay E. Tone, Des Moines, Iowa, and Fred I. Tone, St. Clair, Mich.

Application November 11, 1931, Serial No. 574,453

18 Claims. (Cl. 226—68)

The invention relates to new and useful improvements in an apparatus for gassing and sealing containers.

An object of the invention is to provide an apparatus wherein containers filled with a food or other products are operated upon in succession for replacing air within the container with an inert gas, and wherein said gas-filled container is covered and immediately closed at atmospheric pressure.

A further object of the invention is to provide an apparatus of the above character wherein each container is enclosed in a chamber of only slightly larger dimensions than the container being treated.

A still further object of the invention is to provide an apparatus of the above type wherein the chamber enclosing the container is first placed under a vacuum, after which the vacuum is released and the container filled with an inert gas and the cycle is repeated until all of the air is removed from the container and replaced by the inert gas.

A still further object of the invention is to provide an apparatus of the above type wherein the containers are subjected to vacuum and gassing treatment while they are traveling.

A still further object of the invention is to provide an apparatus of the above type wherein the vacuum pull and the gas supply are controlled by a single movable valve member, with the vacuum ports and the gas ports so disposed as to have a balancing effect on the movable member of the valve, holding the same in proper sealing contact with the parts cooperating therewith without producing thereon any objectionable drag.

A still further object of the invention is to provide an apparatus of the above type wherein the filled containers may be loaded on to a traveling support and the support then raised to place the container in an associated bell by a positively actuated means synchronized with the travel of the bell.

These and other objects will in part be obvious and will in part be hereinafter more fully disclosed.

In the drawings—

Figure 1 is a diagrammatic view showing the complete apparatus embodying the invention;

Fig. 2 is a plan view on an enlarged scale of a portion of the mechanism for treating the containers before they are closed;

Fig. 3 is a vertical sectional view on the line 3—3 of Fig. 2;

Fig. 4 is a similar sectional view taken on an extension of the line 3—3, and illustrating the other half of the machine;

Fig. 5 is a detail view of part of one of the bell crank levers illustrating the safety cut-out device;

Fig. 6 is a detail sectional view, taken on the line 6—6 of Fig. 3;

Fig. 7 is a detail sectional view taken on the line 7—7 of Fig. 3;

Fig. 8 is a horizontal detail sectional view taken on the line 8—8 of Fig. 3;

Fig. 9 is a vertical detail sectional view taken on the line 9—9 of Fig. 3;

Fig. 10 is a top or plan view of the portion of the rotatable valve member;

Fig. 11 is a plan of the lower member of the stationary valve part showing the parts in dotted lines;

Fig. 12 is a plan view of the distributing cap or manifold member of the stationary valve part;

Fig. 13 is a diagrammatic view illustrating the electrical connections of the cut-out safety device, and Fig. 14 is a view showing diagrammatically the cover seating device operating to seat the covers in the containers as they pass from the gassing apparatus to the closing machine.

The invention broadly stated is directed to an apparatus for gassing and closing containers. The containers are filled with the food or other products which are to be sealed therein, and are of the type in which the food product is to be marketed. After the containers are filled, they are fed in succession to traveling supports and loaded thereon. Associated with each support is a bell, and as the supports and bells travel, the support is raised, carrying the container into the bell. The support engages a gasket at the lower edge of the bell and closes and hermetically seals the bell.

There is a pipe leading from each bell to a control valve, and this control valve is provided with ports, some of which are connected with a vacuum creating apparatus, and others of which are connected with a gas supplying apparatus which supplies a gas under pressure slightly above atmospheric pressure. As the bells travel, the port associated with each bell is first connected to the vacuum port for drawing a vacuum on the chamber within the bell. It is then disconnected from the vacuum port, and is connected to a port leading to the gas supplying port, so that the chamber is filled with the gas. In the apparatus disclosed, the port associated with the valve again communicates with a vacuum port, and the gas drawn from the chamber, after which the port connects with the gas supplying port, and the gas is again supplied to the chamber, filling the container. An inert gas is preferably used, which may be of any desired character, such as $CO_2$, nitrogen or other forms of inert gas, or a mixture of gases such as CO, $CO_2$ and nitrogen. The cycle of operations may be repeated again and again, if found necessary, in order to replace substantially all of the air in the container with an inert gas. The support is then lowered and the container removed from the support while it is still moving, and conveyed immediately to a closing machine for the closing of the container. The cover for the container is loosely placed on the container before it is placed in the bell. After the bell is opened, the loose cover on the container is pressed down onto the sealing compound ordinarily provided. The heavy inert gas is thereby retained in the container. Thus the air is excluded until the double seaming operation.

The closing machine used in connection with the apparatus may be of any desired construction, and has only been illustrated diagrammatically in Fig. 1 of the drawings. It should, however, be capable of receiving and closing the containers immediately as they pass from that portion of the apparatus which fills the container with the inert gas. The other portions of the apparatus which receive the filled containers and replace the air therein with the inert gas, will now be described in detail.

The operating parts of the gassing portion of the apparatus are carried by a suitable base indicated by the reference numeral 10. This base is mounted on supporting legs 11, and has, at its periphery, an upwardly extending annular flange 12. There is also mounted on the base, an annular journal or pilot 13, having at its upper edge, an inwardly projecting flange 14. Mounted on the flange 14 is a cam 15 which is ringlike in shape, the inner face of which is circular and the outer face of which is cam-shaped. Above the base is a column or post 16 having near its lower end a laterally projecting flange 17 which rests on the cam 15 as shown in Fig. 4. Screws 18 project at intervals through the flange 17 and through the cam 15 and are screwed into the posts 19 in the upper end of the pilot 13. By means of these screws 18, the column 16, the cam 15 and the base are rigidly secured together. At the upper end of the column 16 is an outwardly extending flange 20. At the top of the column 16 is a cap indicated generally at A. This cap includes a top disklike portion 21 which serves as a closure and also as a support for the spring cap used in connection with the control valve for the vacuum and gassing apparatus. Extending downwardly from the top portion 21 of the cap A is an annular vertical flange portion 22 which serves as a pilot for the control valve and terminates in an outwardly extending horizontal flange 23 which serves as a support for the control valve. At the outer edge of the flange 23 is a downturned flange 24 which serves as an upper pilot or journal for a collar 32 which carries the brackets on which the bells and the container supports are mounted. At the lower edge of the flange 24 is an outturned flange 25 which rests on the flange 20 and is detachably fastened thereto by bolts 26 and nuts 27.

Journaled on the pilot 13 is a collar 28 to which the lower ends of the brackets carrying the bells are attached. This collar has a peripheral projecting flange 29 at the outer edge of which is a downturned flange 30 formed with a series of vertical faces on equal cords of a circle. There are twenty of these vertical cordal faces in the illustrated apparatus. The collar 32 is provided with an outwardly projecting disk 33 terminating in a flange 34 which is formed with a series of similar cordal faces lying in vertical planes parallel with the cordal faces of the flange 30. Secured to the cordal faces of the flanges 30 and 34 by bolts 35 are brackets 36. There are in the illustrated embodiment of the invention, twenty of these brackets, each one of which is provided with flanges 37 and 38 which receive bolts 35 for attaching the brackets to the top and bottom collars. Attached to the collar 28 is an internal gear. The collar 28 has a downturned flange 31 which serves to center the gear. This gear will be described more in detail later. It is the operating means for rotating the collars and the brackets supported thereby about the column 16 as a center trunnion.

Each bracket has a pair of vertically spaced arms 39 and 40 projecting radially outwardly and carrying journals 41 and 42, respectively, in which is mounted a reciprocating spindle 43. Attached to the upper end of the spindle is a table or container support 44. Above the container support is a bell 45 provided on the interior thereof with a chamber which is of slightly larger dimensions than the container to be treated, and conforming generally to the shape of the container, so that when the container is placed in the bell, there will be sufficient clearance space to permit the ready insertion and removal of the container, and little or no excess space on which to draw a vacuum or which is to be charged with gas. The bell is secured to the bracket and the support 44 is moved relative to the bell for lifting the container into the chamber within the bell and for closing the chamber. There is a gasket 45$^a$ at the lower edge of the bell which is engaged by the support 44 so that the support for the container performs the double function of carrying the container up into the bell and of hermetically closing the bell.

Pivoted to each bracket is a bell crank lever 48. Said lever is pivoted at 47 to the bracket. The purpose of this lever is to raise the support carrying the container for the closing of the bell. The lever is provided with an arm 48$^a$ extending downwardly, and an arm 48$^b$ which extends substantially horizontal and away from the center column of the machine. At the lower end of the arm 48$^a$ there is a split sleeve 49 which clamps the shank 51 of a ball stud 50. Said shank is secured by a clamping screw 52 in said sleeve. Mounted on the ball stud 50 is a roller. This roller includes a lower member 53 and an upper member 54 and a hardened sleeve 55 to which these members are attached. The members and the sleeve form a socket to receive the ball stud 50, and the sleeve of the roller is provided with a vertical face adapted to contact with the cam 15. The lower member 53 is provided with a flange 56 which is fastened by means of screws to the bottom edge of the roller sleeve 55. The interior of the sleeve 55 is threaded at the upper end thereof, and the outer face of the member 54 is likewise threaded, so that it can be engaged with the threads on the sleeve. This permits an adjustment of the upper member 53 relative to the lower member to take up wear. The upper face of the upper member 54 is provided with the radial slots 57. A retainer washer 58 is secured to the top edge of the roller sleeve 55 and is provided with radial inwardly extending tongues 59 which may be engaged with the slots 57 and thus the parts firmly locked in a set position.

Beneath each roller 55 is a guide 60. The lower member 53 has a downwardly projecting stud 61 on which is journaled a crosshead block 62 having parallel faces, and this block travels in the guide 60 during the swinging movement of the bell crank lever. The engagement of this block 62 with the guide 60, together with the engagement of the roller 55 with the vertical face of the cam 15, serves to keep the axis of the roller vertical.

The arm 48$^b$ of the lever 48 is provided with an extension 62$^a$ which is pivoted to the arm at 63. This extension is also secured to the outer end of the arm by a shear pin 64. The arm 48$^b$ has a depending portion provided with a slot which is formed on the arc of a circuit having its center at the pivot 63. On the arm 62$^a$ is a stud 66 which projects through a slot 65. A washer 67 and a nut 68 are attached to the stud 66. Between the washer 67 and the face of the arm is a spring 69 (see Fig. 6). This arrangement is for the purpose of holding the arm 48$^b$ and the extension 62$^a$ snugly together.

At the outer end of the extension 62$^a$ of the arm 48$^b$ is a yoke 70 which bears against the under face of a milled collar 71 attached to the spindle 43. A split nut 72 is threaded on the spindle above the collar 71 and is locked in a set position thereon by means of a screw 73. The raising or lowering of the nut 72 on the spindle 43 controls the travel of the table 44 and thereby the amount of compression exerted on the bell gasket by said container support or table 44.

It will be noted that the brackets, the bells and the container supports form independent units and may be attached as a whole to the supporting collars therefor. By changing the collars and the dimensions thereof, other units may be added or removed, and thus the machine is readily capable of assembly for greater or smaller capacity in the treatment of containers. The collars and brackets supported thereby are all rotated about the central column. This is accomplished by the internal gear 84 which has been referred to above. Mounted below the base 10 is a worm gear case 74. At its upper end, the gear case has a flange 75 piloted in the under face of the base by a counter bore 76. The gear case 74 is fastened to the base by suitable screws. A worm shaft 77 projects horizontally through the gear case 74 and carries a worm 78. The shaft 77 is operated by a suitable electric motor 77$^a$. An upright shaft 79 is journaled in the gear case 74 and carries a worm gear 80 meshing with the worm 78. On the upper end of the shaft 79 is a pinion 81, which meshes with three gears 82 journaled on studs 83 projecting upwardly from the base 10. These intermediate gears 82 mesh with a gear 84 secured by the screws 85 to the collar 28. Thus it is that the rotations of the shaft 77 impart a rotation to the internal gear 84, and through the internal gear, the collars and the brackets attached thereto are rotated about the central column 16. The flange 12 serves to form with the base a well or lubricant holder, so that the driving mechanism and the lower collar journals operate in oil.

After the containers are placed in the bells and the bells closed, then each container is first placed under vacuum, after which the vacuum is replaced with an inert gas. For this purpose, there is attached to each bell a pipe 90 which leads to a control valve. The control valve is mounted on the column 16 and consists of an annular rotatable member 86 in the form of a flat ring which rests upon the flange 23 of the cap A. The member 86 travels on the flange 23 and is piloted or centered thereon by the flange 22. The rotating valve member 86 has at its upper face a series of radially elongated slots 89 (see Fig. 10). There is a slot 89 for each bell and it is disposed on the valve member radially opposite the bell which it is associated with. These slots terminate short of the inner and outer faces of the valve member. The tubes or pipes 90 are connected to the valve member so as to communicate with the respective slots 89. Above the valve member 86 is a fixed member 87 in the form of a flat ring. This fixed member of the valve is provided with two slots 91 in its under face spaced from each other and elongated in arcs of a circle having its center at the center of rotation of the traveling devices. These slots are adapted to be connected to the vacuum creating apparatus. It will be noted that the inner ends of these slots are tapered, the purpose of which is to draw the vacuum gradually on the chamber by the gradual opening of the port to the vacuum pull. There are also two slots 93 in the under face of this stationary valve member 87 which are located at a different radial distance from the center of rotation of the traveling devices with relation to slots 91. The valve member 87 is provided with ports 92 extending upwardly from the slots 91, and with ports 94 extending upwardly from the slots 93. Above this stationary valve member 87 is a distributing cap 88 which rests on the valve member 87 and is rigidly fastened thereto by screws 95. The member 88 is keyed to the column cap A at 88$^a$, and this holds the cap member 88 and the valve member 87 from rotation. It provides, however, for a vertical adjustment so that a yielding pressure may be exerted by the stationary valve member against the movable valve member.

The distributing cap 88 has on its under face, an elongated arcuate slot 96 which is above and communicates with the slots 91 (see Fig. 12). The cap 88 has on its under face, a similar elongated arcuate slot 97 which communicates with the slots 93. The slots 96 and 97 are of considerably greater length than the slots 91 and 93 with which they are associated. Attached to the cap member 88 is a manifold 96$^a$ which communicates with the slot 96. This manifold 96$^a$ is connected to a pipe 98 which leads to the vacuum creating means. Also connected with the slot 97 is a pipe 99 which leads to a source of gas supply.

The various vacuum passages are so arranged that as the bells travel around the column, each bell is in succession subjected to a vacuum treatment, a gas treatment, a second vacuum treatment and a second gas treatment. The slots 91 and 93 are staggered with relation to each other and are so arranged that each radial slot 89 is in a neutral position when it does not communicate with either the slot 91 or 93 between successive vacuum and gas treatments.

In Fig. 11 of the drawings there is shown in broken lines, and diagrammatically, the traveling slots 89 and the manner in which they pass the ports or slots 91 and 93. The slots or ports 89 travel in a counter-clockwise direction as viewed in this figure. The result is that the slot will engage first the tapered end of the slot 91 and a vacuum will be gradually drawn on the chamber within the bell associated with said slot.

Before the traveling slot reaches the stationary slot in the stationary valve member, the bell is closed. While the slot 89 is traveling along this slot 91 and to the position indicated at a, a vacuum is drawn on the container. The slot then reaches the neutral position, cutting off the chamber from the vacuum pulling apparatus, and then it passes over the slot 93, and while it is passing along this slot 93, as indicated at b, gas under pressure is supplied to the chamber and to the container, replacing the vacuum. When the slot reaches the position indicated at c, it has passed from connection to the slot 93 and again is in a neutral position. This, of course, prevents any escape of the gas into the vacuum creating apparatus. The slot then passes along the slot 91 connected to the vacuum pulling apparatus, and a vacuum is again created on the chamber and the container, drawing out the gas which was supplied thereto. When the position d is reached, the slot is again in the neutral position, and disconnected from the vacuum pulling apparatus, and further movement brings it into connection with the slot 93 so that gas is again supplied to the chamber and to the container. After this second gas treatment, then it is that the support is lowered, opening the bell and the charged container is removed from the support for closing.

It will be noted that the container is placed under vacuum and is supplied with gas while the bells are traveling. The extent of vacuum pull on the container may be comparatively low, for the reason that the cycle of operation is repeated. Furthermore, the gas pressure may be relatively low for the same reason. Also the chamber surrounding the container is of small proportions, and therefore, the vacuum may be drawn quickly, and a small amount of gas is utilized in the charging of the chamber.

The cap 21 is provided with a post 100 in the form of a sleeve, thus providing a chamber 101 for the lubricant. The chamber is closed by a cap member 102. A tube 103 leads from the lower end of the chamber to a fitting 104 by which lubricant is supplied to the faces of the flange 23 and the rotating valve 86 for lubricating the same. Said valve may be provided with a port 105 for supplying lubricant to the pilot flange 22 and also to the contacting faces of the movable valve and the fixed valve member 87. The vacuum pull on the ports or slots 91 serves to hold the stationary valve member in contact with the movable valve member. The pressure of the gas supply in the ports 93 balances to a certain extent the vacuum pull on the stationary valve member. These ports are so proportioned that the stationary valve member is held in sealing contact with the rotating valve member and without any objectionable drag thereon. The apparatus may, however, be used under conditions were there is no excess of vacuum pull desired, and therefore, springs have been provided for holding the stationary valve in proper sealing contact with the movable valve member. Keyed to the post 100 is a hub 106 of a spring abutment plate 107. A series of coiled springs 108 are interposed between the top of the fixed valve member and the under surface of the abutment plate 107. These springs yieldingly force the stationary valve member downwardly into contact with the movable valve member. A nut 109 is threaded on to the upper end of the post 100 and may be used for regulating the pressure imposed by the springs on the valve member.

As a means for driving the valve member 86 and maintaining its synchronism with the movement of the bells, the collar 32 is provided with a series of driving dogs 110 (see Fig. 9). These dogs have upwardly projecting arms 111 forming therebetween a recess 112 which receives the fitting 113 where the pipe 90 enters the valve member 86. It will be understood that it is not necessary to provide a dog for each pipe, but sufficient are provided for the purpose of maintaining the valve member in proper timing with the bells.

The filled cans C which are to be treated and closed are moved along a guideway 130 by a suitable conveying means, and are delivered to a loading device for loading the containers on to the supports 44. Each loading device includes a supporting table 114. Located beneath the table 114 is a standard 131 in which a shaft 132 is journaled for rotation. This shaft carries a gear wheel 133 which meshes with a gear wheel 115 which travels with the bells. The arm 39 of the bracket 36 is formed into a gear tooth 115$^a$. The arm performs the double function of supporting the spindle 43 carrying the support 44 for the container, and as a driving tooth for the loading mechanism and also the unloading mechanism. Between two adjacent brackets is a filler tooth 116. These filler teeth are attached to lugs on the arms 39, and together with the teeth 115$^a$ make up the gear wheel 115. There is one tooth between adjacent bell units, and if the units are increased in number, this will increase the size of the driving gear. The center of the spindle 43 passes through the pitch line of the teeth 115$^a$ and 116, and the center of the container support 44 is above the pitch line of the gear teeth forming the gear wheel 115. As the bells travel around the center column, the gear wheel 133 is rotated, and this imparts a rotation to the shaft 132. At the upper end of the shaft 132 is a cap plate 134. Journaled in the cap plate and in the hub of the gear 133 is a series of spindles 135. Mounted on each spindle 135 is a yoke bracket 136. Attached to the yoke bracket 136 is an arm 137. As shown in the drawings, there are five spindles and five arms. Each yoke bracket carries an arm 138 on which is mounted a roller 139 cooperating with a stationary cam 140. An arm 137 extends through a slot 137$^a$ in the cap plate 134. A spring 145 holds the roller in contact with the cam and the side wall of the slot serves as a stop to limit the swinging movement of the arm when out of contact with the cam. These arms travel as the gear rotates over the conveyor for the containers, and the arm will pass in rear of a container and carry the same along a guide rail 142 and on to the traveling container support 44. When a container is centered on the container support, the roller 139 will engage the portion 140$^a$ of the cam 140 and will be forced outward away from the center of rotation about which these arms move. This will cause the arm 137 to be retracted from engagement with the container. The arms are traveling about a shorter radius than the container supports, and this permits the container to be centered on the support, after which the arm is retarded in its movements and gives up control of the container to the support on which it rests. The cam 140 is cut away at 140$^b$ to allow the roller to move inwardly through the action of the spring thereon, and thus the arm is brought back into normal position for engagement with the container.

A similar device is provided for unloading the containers. This device includes a standard carrying a shaft which is rotated by a gear 143. There are four spindles 145 carried by the take-away or unloading device, and on each spindle is an arm 146 which engages the container, and an arm 147 carrying a roller 148 cooperating with a cam 149 which is stationary. The containers are removed from the supports and moved along the table 114 directed by a guide rail 150. These arms carry the containers on to a feed drum 151 which delivers the containers to the closing machine which is indicated at 152 in Fig. 1 of the drawings. The seaming mechanism is indicated at 153 and as shown, is of the single station type, which receives one container after another and joins the end or cover to the body portion by double seaming.

From the above it will be noted that a gassing and closing machine for containers has been provided wherein the containers are fed into the apparatus one after another. The containers are received by the loading arms 137 and placed thereby on the traveling supports 44. The cover is loosely applied to the containers and may be secured thereto by clinching so as to insure that it will not be dislodged from the container during the handling thereof. It may be desirable to facilitate the drawing of a vacuum on the container and the charging of the same with gas to lift the cover or end from the container in the treating chamber, in which case, of course, the cover would not be clinched to the body, but would merely rest lightly thereon as the container is fed on to the support 44. The support 44 with the container thereon is raised carrying the container into the bell and closing the chamber within the bell by bringing the support into contact with the gasket at the lower end of the bell. After the chamber is closed, the control valve connects the chamber with the vacuum drawing apparatus, and a vacuum is drawn on the chamber. This is followed by a connection of the chamber to the apparatus for supplying the inert gas, and the chamber is charged with an inert gas. The chamber is again vacuumized and again supplied with an inert gas, after which the support for the container moves downward, thus carrying the container out of the chamber. The container is taken from the support by the traveling arm 146 of the unloading device and placed on the conveyor which immediately carries the containers to the closing machine. The heavy gas in the container excludes substantially all of the air from the container during the short interval between the opening of the container and the sealing of the container by the closing machine.

In order that the machine may be stopped in case of a jam in the placing of the containers in the bells, the arm 62 is provided with a lug 118 on which is mounted a switch carrying arm 119. This switch carrying arm is provided with a finger 120 resting on the arm 48ᵇ of the bell crank lever. There are suitable clips 121 for supporting a mercury contact switch indicated at 122. This mercury switch has its contact at the end 122ᵃ of the mercury tube, and this is normally the lower end, so that the circuit is closed through the switch. When the shear pin 64 is severed, then the extension arm 62 will change its position from that shown in Fig. 4 to that illustrated in Fig. 5. The pivot point 121ᵃ of the switch carrying arm 119 is so disposed that when the shear pin is severed, the arm 48ᵇ, when it moves upward, will tilt the switch so as to break the circuit. The contact points are connected by leads 123 and 124. The leads 123 and 124 are connected in any suitable way with brushes 125 and 126 carried by the rotatable valve member (see Fig. 13). These brushes contact with commutator rings 127 and 128 carried by the stationary valve member. The commutator rings are connected by suitable posts with wires 129 which control the relay switch of the motor 77ᵃ. Thus, when the safety device is in a normal position, it does not in any way affect the operation of the apparatus. If the upward travel of the table 44 is prevented by a jam, the shear pin 65 will be severed, and the upward movement of the arm 62 will cease. This brings about a tilting of the switch 122 and the breaking of the circuit through the motor, thus automatically stopping the machine.

The air in the container is displaced by an inert gas which is preferably heavier than air, and therefore, as the container passes from the gassing device to the closing machine, little or no air will enter the container. In order to aid in excluding the air from the container during this period, it is desirable to seat the covers on the containers. This is accomplished by a plate 160 which is elongated and located directly above the path of travel of the containers as they pass to the feed drum of the closing machine. This plate 160 has the forward end 161 thereof upturned so as to facilitate the passing of the containers C beneath the same. The cover C' is forced down into the container and is firmly seated therein and will retain this position as it passes along the drum to the closing machine. The plate 160 is supported by brackets 162, one of which is shown in Figures 2 and 14. A rod 163 passes through the bracket and carries the plate. A spring 164 surrounding each rod yieldingly forces the plate downwardly. The head 165 on the rod limits the downward movement of the plate when there is no container beneath the same.

It is not thought necessary to give further details of the operation and uses to which this machine may be applied. It may be mentioned, however, that the machine is particularly adapted for the packing of coffee in an inert gas, for the reason that coffee when freshly roasted, evolves a gas, and it is desirable to retain this gas within the coffee cells during storage. By the apparatus described, the coffee in the container is quickly subjected to vacuum treatment, and the vacuum pull may be of a relatively low degree. This prevents the drawing of the gas out of the coffee cells. While the degree of vacuum used is relatively low, by the repeating of the operations, substantially all of the air may be removed from the container. While the apparatus as illustrated is especially adapted for charging the container with an inert gas, it will be understood that the containers may be treated in other ways by slight modification of the apparatus. It is also understood that many changes may be made in the arrangement of the parts and the details of construction without departing from the spirit of the invention as set forth in the appended claims.

Having thus described the invention, what we claim as new and desire to secure by Letters Patent, is—

1. An apparatus for gassing and closing containers including in combination a series of traveling bells, a container support associated with each bell and cooperating therewith to form an enclosed chamber for the container, means for imparting a relative movement to the support and bell for placing the containers in the bells and removing the same therefrom, a control valve associated with said bells, and a pipe leading from each bell to the control valve, said control valve being adapted to connect said bells in succession with a vacuum creating means and a gas supplying means whereby the container is supplied with an inert gas, said control valve including a stationary member and a member rotating in timing with the traveling bells, said members having substantially horizontal contacting faces.

2. An apparatus for gassing and closing containers including in combination a series of traveling bells, a container support associated with each bell and cooperating therewith to form an enclosed chamber for the container, means for imparting a relative movement to the support and bell for placing the containers in the bells and removing the same therefrom, a control valve associated with said bells, and a pipe leading from each bell to the control valve, said control valve being adapted to connect said bells in succession with a vacuum creating means and a gas supplying means whereby the container is supplied with an inert gas, said control valve including a stationary member and a member rotating in timing with the traveling bells, said members having substantially horizontal contacting faces, said valve having ports, and means for subjecting the valve through said ports to vacuum and to pressure, said ports and means being so constructed and arranged that the vacuum pull is always greater than the pressure in the valve.

3. An apparatus for gassing and closing containers including in combination a series of traveling bells, a container support associated with each bell and cooperating therewith to form an enclosed chamber for the container, means for imparting a relative movement to the support and bell for placing the containers in the bells and removing the same therefrom, a control valve associated with said bells, a pipe leading from each bell to the control valve, said control valve being adapted to connect said bells in succession with a vacuum creating means and a gas supplying means whereby the container is supplied with an inert gas, said control valve including a stationary member and a member rotating in timing with the traveling bells, said members having substantially horizontal contacting faces, and a single pipe extending from said control valve to each bell through which a vacuum is drawn and the gas supplied to the bell.

4. An apparatus for gassing and closing containers including in combination a series of traveling bells, a container support associated with each bell and cooperating therewith to form an enclosed chamber for the container, means for imparting a relative movement to the support and bell for placing the containers in the bells and removing the same therefrom, a control valve associated with said bells, said control valve being adapted to connect said bells in succession with a vacuum creating means and a gas supplying means whereby the container is supplied with an inert gas, said control valve including a stationary member and a member rotating in timing with the traveling bells, said member having substantially horizontal contacting faces, a single pipe extending from said control valve to each bell through which a vacuum is drawn and the gas supplied to the bell, a distributor cap associated with said stationary valve member, and springs bearing on said cap and yieldably holding said valve members in contact.

5. An apparatus for gassing containers comprising a stationary supporting member, a rotary carrier mounted thereon, a series of gassing units mounted on said carrier, each including a projecting bracket, a bell mounted thereon, a container support for placing a container in said bell and for closing said bell, a bell crank lever having one arm thereof connected to said container support for raising and lowering the same, a roller carried by the other arm, and a stationary cam with which said rollers cooperate for operating the bell cranks in succession, said roller being mounted on a ball stud so as to maintain a vertical contacting line with the stationary cam for all positions of the bell crank.

6. An apparatus for gassing containers comprising a stationary supporting member, a rotary carrier mounted thereon, a series of gassing units mounted on said carrier, each including a projecting bracket, a bell mounted thereon, a container support for placing a container in said bell and for closing said bell, conveying devices for loading the filled containers on the container supports, and a traveling member carried by said brackets and operating said conveying mechanism.

7. An apparatus for gassing containers comprising a stationary supporting member, a rotary carrier mounted thereon, a series of gassing units mounted on said carrier, each including a projecting bracket, a bell mounted thereon, a container support for placing a container in said bell and for closing said bell, a conveying mechanism for loading the filled containers on the container supports, a conveying mechanism for removing the containers from the supports for gassing, and a member carried by said brackets and cooperating with the conveying mechanisms for operating the same in timing with the travel of the container supports.

8. An apparatus for gassing containers comprising a stationary supporting member, a rotary carrier mounted thereon, a series of gassing units mounted on said carrier, each including a projecting bracket, a bell mounted thereon, a container support for placing a container in said bell and for closing said bell, conveying devices for loading the filled containers on the container supports, each bracket being provided with a gear tooth, and a gear tooth located between adjacent brackets and carried thereby and constituting with the gear teeth on the brackets a gear wheel for operating the conveying device.

9. An apparatus for gassing containers comprising a stationary supporting member, a rotary carrier mounted thereon, a series of gassing units mounted on said carrier, each including a projecting bracket, a bell mounted thereon, a container support for placing a container in said bell and for closing said bell, a bell crank lever having one arm thereof connected to said container support for raising and lowering the same, a roller carried by the other arm, a stationary cam with which said rollers cooperate for operating the bell cranks in succession, said arm of the bell crank connected to the container support being made in sections connected by a shear pin which is severed in case of a jam, and means operated by said bell crank when said pin is severed for stopping the machine.

10. An apparatus for gassing containers comprising a stationary supporting member, spaced collars mounted on said supporting member for rotation thereon, radially projecting brackets connected to said collars, means connected with one of said collars for rotating the same, a bell fixed to each bracket, a container support mounted on each bracket and movable relative to the bell for placing a container in the bell and closing the bell, a bell crank carried by each bracket and connected to the container support for moving the same, and means operating on said bell crank as the carrier rotates for oscillating the bell crank.

11. An apparatus for gassing containers comprising a stationary supporting member, spaced collars mounted on said supporting member for rotation thereon, radially projecting brackets connected to said collars, means connected with one of said collars for rotating the same, a bell fixed to each bracket, a container support mounted on each bracket and movable relative to the bell for placing a container in the bell and closing the bell, a bell crank carried by each bracket and connected to the container support for moving the same, a roller carried by said bell crank, and a stationary cam with which said roller cooperates for oscillating the bell crank.

12. An apparatus for gassing containers comprising a stationary supporting member, spaced collars mounted on said supporting member for rotation thereon, radially projecting brackets connected to said collars, means connected with one of said collars for rotating the same, a bell fixed to each bracket, a container support mounted on each bracket and movable relative to the bell for placing a container in the bell and closing the bell, a bell crank carried by each bracket and connected to the container support for moving the same, a roller carried by said bell crank, a stationary cam with which said roller cooperates for oscillating the bell crank, said roller being mounted on the ball stud, and means cooperating with said roller for maintaining the face thereof contacting with the cam substantially vertical for all positions of the bell crank.

13. An apparatus for gassing containers comprising a stationary supporting member, a rotary carrier mounted thereon, a series of gassing units mounted on the carrier each including a projecting bracket, a bell mounted thereon, a container support for placing a container in the bell and for closing the bell, conveying devices for loading the filled containers on the container supports, a gear wheel for operating the conveying devices, each bracket being provided with a gear tooth, and a gear tooth located between adjacent brackets and carried thereby and constituting with the gear teeth on the brackets a gear wheel meshing with the gear wheel for the conveying device, the center of the support for the container being located directly over the pitch lines of the cooperating gears.

14. An apparatus for gassing and closing containers including in combination a chamber adapted to enclose the container, means for replacing the air in the container with an inert gas heavier than air, means for sealing the container located outside of the chamber, means for receiving the containers after the chamber is opened and delivering the same to the sealing means, and means associated therewith for yieldingly bearing on the cover as it passes from the gassing machine for seating the cover on the container to aid in retaining the heavy inert gas therein.

15. An apparatus of the kind described, including in combination a series of traveling chambers, means for placing containers in the chambers and for then closing the chambers, a control valve associated with said chambers, a pipe leading from each chamber to the control valve, said control valve being adapted to connect said chambers in succession with a vacuum creating means and a gas supplying means, whereby the container in the chamber is supplied with an inert gas, said control valve including a stationary member and a member rotating in synchronized timing with the traveling chambers, said valve members having substantially horizontal contacting faces, means for opening the chambers, and means for removing the containers therefrom.

16. An apparatus for gassing containers comprising a stationary supporting member, a rotary carrier mounted thereon, a series of gassing units mounted on said carrier, each including a projecting bracket, a bell mounted thereon, a container support for placing a container in said bell and for closing said bell, conveying means for unloading the filled containers from the container supports, and a traveling member carried by said brackets and operating said conveying mechanism.

17. An apparatus for gassing and closing containers, including in combination a chamber adapted to enclose a container, means for replacing the air in the container with an inert gas heavier than air, means for sealing the container located outside the chamber, means for receiving the container after the chamber is opened and delivering the same to the sealing means, and means associated therewith for yieldingly pressing a cover home on the container after the chamber is opened.

18. An apparatus for gassing and closing containers, including in combination a chamber adapted to be closed for enclosing the container, means for replacing the air in the container with an inert gas heavier than air, means for sealing the container located outside the chamber, means for receiving the containers after the chamber is opened and delivering the same to the sealing means, and means associated therewith for yieldingly pressing a cover home on the container after the chamber is opened for the removal of the container, including a plate adapted to press down on the cover, yielding means for pressing the plate against the cover and for permitting slight rocking movement of the plate.

JAY E. TONE.
FRED I. TONE.